(12) United States Patent
Bibby et al.

(10) Patent No.: US 8,315,274 B2
(45) Date of Patent: Nov. 20, 2012

(54) SYSTEM AND METHOD FOR SUPPORTING SYNCHRONOUS SYSTEM COMMUNICATIONS AND OPERATIONS

(75) Inventors: Dave Bibby, Scottsdale, AZ (US); David A. Dietz, Scottsdale, AZ (US); Brett A. Eddy, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1020 days.

(21) Appl. No.: 11/394,036

(22) Filed: Mar. 29, 2006

(65) Prior Publication Data
US 2007/0230501 A1 Oct. 4, 2007

(51) Int. Cl.
*H04J 3/16* (2006.01)
(52) U.S. Cl. ......... 370/468; 370/465; 370/464; 370/477
(58) Field of Classification Search ................ 370/468, 370/465, 464, 477; 709/230
See application file for complete search history.

(56) References Cited

U.S. PATENT DOCUMENTS

| | | | |
|---|---|---|---|
| 4,494,232 A * | 1/1985 | Dambrackas et al. | 370/428 |
| 4,805,107 A | 2/1989 | Kieckhafer et al. | |
| 4,816,989 A | 3/1989 | Finn et al. | |
| 4,914,657 A | 4/1990 | Walter et al. | |
| 4,933,940 A | 6/1990 | Walter et al. | |
| 4,972,415 A | 11/1990 | Walter et al. | |
| 4,980,857 A | 12/1990 | Walter et al. | |
| 4,987,571 A * | 1/1991 | Haymond et al. | 370/445 |
| 5,377,206 A | 12/1994 | Smith | |
| 5,384,563 A | 1/1995 | Massey | |
| 5,392,280 A * | 2/1995 | Zheng | 370/353 |
| 5,404,363 A | 4/1995 | Krause et al. | |
| 5,412,648 A | 5/1995 | Fan | |
| 5,691,484 A | 11/1997 | Feller | |
| 5,694,542 A | 12/1997 | Kopetz | |
| 5,801,951 A | 9/1998 | Burns, II et al. | |
| 5,887,143 A | 3/1999 | Saito et al. | |
| 5,892,762 A | 4/1999 | Okuda et al. | |
| 6,052,753 A | 4/2000 | Doerenberg et al. | |
| 6,133,846 A | 10/2000 | Birkedahl et al. | |
| 6,141,355 A | 10/2000 | Palmer et al. | |
| 6,272,647 B1 | 8/2001 | Rolston | |
| 6,308,282 B1 | 10/2001 | Huang et al. | |
| 6,442,135 B1 | 8/2002 | Ofek | |

(Continued)

FOREIGN PATENT DOCUMENTS

AT 407582 4/2001

(Continued)

OTHER PUBLICATIONS

"AFDX/ARINC 664 Tutorial (1500-049)", "available at http://www.acalmicrosystems.co.uk/whitepapers/sbs8.pdf?PHPSESSID=bd030f1b97f284d41ec00cf1ea2d5226", 2005, Publisher: Condor Engineering, Inc.

(Continued)

*Primary Examiner* — David Oveissi
(74) *Attorney, Agent, or Firm* — Fogg & Powers LLC

(57) ABSTRACT

Apparatus and methods are provided for controlling synchronous and asynchronous communications in an avionic network. The method includes receiving one or more asynchronous messages and one or more synchronous messages, allocating each of the synchronous messages to a corresponding predetermined time slot while producing an unoccupied portion in at least one of the predetermined time slots, and allocating the asynchronous messages to one or more of the unoccupied portions of the predetermined time slots.

19 Claims, 3 Drawing Sheets

U.S. PATENT DOCUMENTS

| | | | |
|---|---|---|---|
| 6,467,003 | B1 | 10/2002 | Doerenberg et al. |
| 6,483,846 | B1 | 11/2002 | Huang et al. |
| 6,754,228 | B1 | 6/2004 | Ludwig |
| 6,801,951 | B1 | 10/2004 | Roden, III |
| 6,901,443 | B1 | 5/2005 | Huang et al. |
| 6,973,067 | B1 * | 12/2005 | Haartsen ............... 370/337 |
| 7,110,365 | B2 | 9/2006 | Lee et al. |
| 7,236,796 | B2 | 6/2007 | Soliman |
| 7,349,339 | B2 * | 3/2008 | Meckelburg et al. ......... 370/235 |
| 7,352,770 | B1 * | 4/2008 | Yonge et al. ................. 370/445 |
| 2002/0196803 | A1 * | 12/2002 | Ota .............................. 370/442 |
| 2003/0007455 | A1 | 1/2003 | Kohzuki et al. |
| 2003/0235216 | A1 | 12/2003 | Gustin |
| 2004/0100989 | A1 | 5/2004 | Chiu et al. |
| 2004/0153859 | A1 | 8/2004 | Kopetz |
| 2004/0261101 | A1 | 12/2004 | Iwamura |
| 2005/0117596 | A1 | 6/2005 | Kopetz |
| 2006/0083258 | A1 * | 4/2006 | Kwon et al. ................. 370/458 |
| 2007/0183435 | A1 * | 8/2007 | Kettering et al. ............. 370/401 |
| 2007/0286102 | A1 * | 12/2007 | Shimokawa et al. ......... 370/310 |

FOREIGN PATENT DOCUMENTS

| | | |
|---|---|---|
| AT | 408383 | 11/2001 |
| AT | 410491 | 5/2003 |
| AT | 411380 | 12/2003 |
| EP | 0596650 | 5/1994 |
| EP | 0658257 | 6/1995 |
| WO | 0031932 | 6/2000 |
| WO | 0072156 | 11/2000 |
| WO | 0195550 | 12/2001 |
| WO | 0195562 | 12/2001 |

OTHER PUBLICATIONS

European Patent Office, "European Search Report", Feb. 3, 2009, Published in: EP.

"Part 3: Carrier Sense Multiple Access with Collision Detection (CSMA/CD) Access Method and Physical Layer Specifications", "IEEE Standard 802.3", 2000, Publisher: IEEE.

Kopetz, Hermann et al., "The Time-Triggered Ethernet (TTE) Design", "Object-Oriented Real-Time Distributed Computing, 2005. ISORC 2005. Eighth IEEE International Symposium on", May 18-20, 2005, pp. 22-33, Publisher: IEEE.

Sharon, O and M. Spratt, "A CSMA/CD compatible MAC for real-time transmissions based on varying collision intervals", "INFOCOM '98: Seventeenth Annual Joint Conference of the IEEE Computer and Communications Societies", 1998, pp. 1265-1272, vol. 3, No. 29, Publisher: IEEE.

* cited by examiner

SYSTEM AND METHOD FOR SUPPORTING SYNCHRONOUS SYSTEM COMMUNICATIONS AND OPERATIONS

FIELD OF THE INVENTION

The present invention generally relates to avionics networks, and more particularly relates to redundant avionics networks.

BACKGROUND OF THE INVENTION

Ethernet type networks have been used in communication networks for implementing communication among various network components. An Ethernet network may be used to send or route data in a digital form by packets or frames. Each packet contains a set of data, and the packet is generally not interpreted while sent through the Ethernet network. The Ethernet network is typically composed of different equipment that subscribes to the network and connects to each other through switches. Each network subscriber can send packets in digital form generally at any time to one or more other subscribers. When a switch receives the packets, the destination equipment is determined, and the packets are switched to such equipment. In a switched Ethernet type network, the term "switched" refers to the packets being switched in switches on appropriate outputs.

More recently, Ethernet networks have been used in avionic network environments. Avionic systems generally include numerous components that may exchange data among one or more other components. For example, a variety of external sensors may gather information that is routed via an avionics network to a number of different aircraft components. To facilitate communications and operations of the avionic network, a communication bus is typically used, such as an Avionics Standard Communication Bus (ASCB) developed by Honeywell, Inc. ASCB provides access using a predefined schedule known to all nodes in the avionic network. For example, each node is synchronized to a common schedule and transmits during a corresponding time slot. Timing messages may be transmitted at the start of each frame to maintain synchronous transmissions. This configuration generally provides highly deterministic, low latency, and low jitter data transfer.

Standards or protocols have been promulgated to fulfill desired operating parameters of the avionic network. For example, Aeronautical Radio Inc. (ARINC) 664 sets forth an aeronautical standard, based on a switched Ethernet network, for use in an aircraft environment. In some avionic systems using ARINC 664, an asynchronous communication bus is used with "bounded determinism" (e.g., a predictable probabilistic outcome) for message delivery. For example, each end system in the avionic network maintains a point-to-point connection with one or more network switches. With ARINC 664, each end system may transmit a message, having a predetermined size, at a predetermined rate.

Accordingly, it is desirable to provide an avionic network that accommodates both synchronous and asynchronous communications. It is also desirable to provide a method for controlling synchronous and asynchronous communication in an avionic network. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus and method are provided for controlling synchronous and asynchronous communication in an avionic network. In an exemplary embodiment, a method for synchronizing communication in an avionics Ethernet network is provided comprising receiving a first asynchronous message and one or more synchronous messages, allocating each of the one or more synchronous messages to a corresponding one of one or more predetermined time slots while producing an unoccupied portion in at least one of the one or more predetermined time slots, and allocating the first asynchronous message to the unoccupied portion of one of the at least one of the one or more predetermined time slots.

In another exemplary embodiment, a method for synchronizing one or more periodic communications and one or more aperiodic communications in an Ethernet network is provided. Each of the one or more periodic communications is allocated to a corresponding one of one or more predetermined time slots. The method comprises determining a portion for each of the one or more predetermined time slots, receiving the one or more aperiodic communications, and allocating at least one of the one or more aperiodic communications to the portion of at least one of the one or more predetermined time slots. The portion of each of the one or more predetermined time slots is unoccupied by a corresponding one of the one or more periodic communications.

In another exemplary embodiment, an apparatus for managing data communications in an Ethernet network is provided, the apparatus comprising a processor having an input for receiving at least one periodic communication and at least one aperiodic communication, a memory coupled to the processor, and a communication interface coupled to the processor. The processor is configured to schedule each of the at least one periodic communication for transmission during a corresponding one of at least one predetermined time slot, and schedule each of the at least one aperiodic communication for transmission during one of the at least one predetermined time slot. The memory stores the at least one data communication. The switch transmits each of the at least one periodic communication and each of the at least one aperiodic communication in response to the processor.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
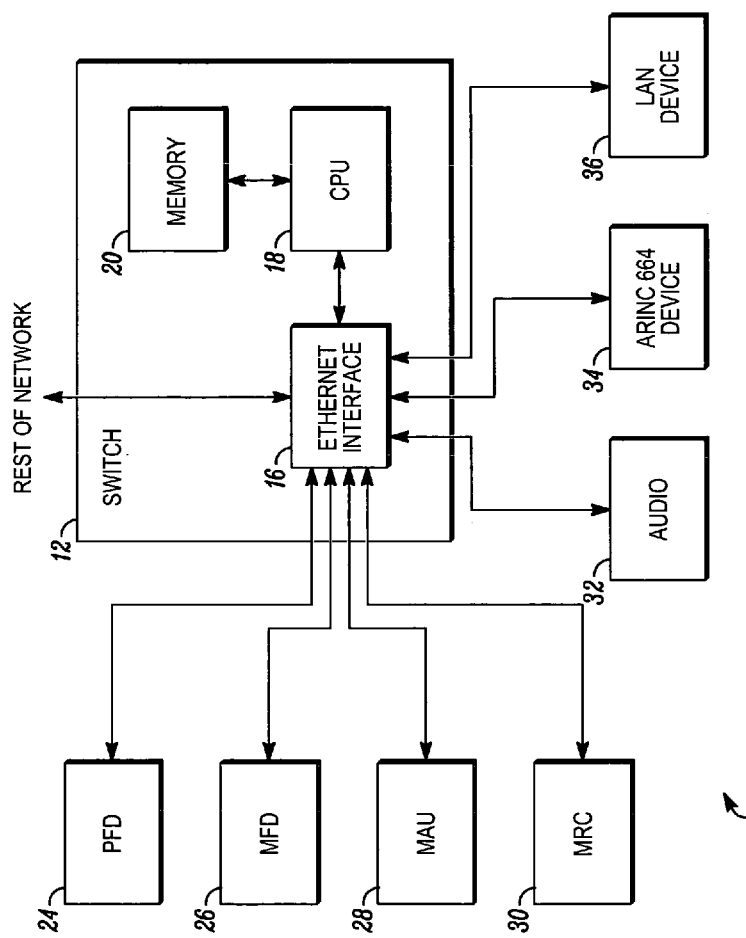
FIG. 1 is a block diagram of a switch and a plurality of line replaceable units in accordance with an exemplary embodiment of the present invention.

Referring to the drawings, FIG. 1 is a block diagram of a switch 12 and a plurality of line replaceable units (LRUs) 24, 26, 28, 30, 32, 34, 36 in accordance with an exemplary embodiment of the present invention. To generally illustrate the present invention, the switch 12 and LRUs 24, 26, 28, 30, 32, 34, 36 form a basic communication entity 10 that may be used in an avionic network such as an Ethernet type network where one or more LRUs are coupled to one or more switches, and one or more of these switches may be coupled to other portions of the network. An LRU can be any of a variety of devices used in an avionics network environment, such as a sensor, a switch, an avionic instrument, and the like. Each of the LRUs communicates with a desired device or node in the avionic network via one or more corresponding switches. In this exemplary embodiment, a primary flight display (PFD) 24, a multi-function display (MFD) 26, a modular avionics unit (MAU) 28 coupled to the switch, a modular radio cabinet (MRC) 30, an audio device 32, an ARINC 664 device 34, and a local area network (LAN) device 36 are each coupled to the switch 12. More of less of these LRUs or other types of LRUs, including other switches, may be coupled to the switch 12.

The switch 12 controls routing of communication from the LRUs coupled thereto (e.g., PFD 24, MFD 26, MAU 28, MRC 30, audio device 32, ARINC 664 device 34, LAN device 36, and the like) to other LRUs that may be coupled to the switch 12 or to other nodes in the avionic network. The switch 12 comprises an Ethernet interface 16, a central processing unit (CPU) 18 coupled to the Ethernet interface 16, and a memory 20 coupled to the CPU 18. The Ethernet interface 16 includes one or more ports for coupling to each of the LRUs (e.g., a wired or fiber connection coupling each of the LRUs) to provide bi-directional communication.

For each frame of communication to the avionic network, a synchronization signal is transmitted (e.g., via the CPU 18 and Ethernet interface 16) to one or more of the LRUs, preferably to those LRUs operating using a synchronized communication format (e.g., Avionics Standard Communication Bus (ASCB)) indicating the start of a frame for transmitting data packages or messages. In an exemplary embodiment, one or more of the LRUs coupled to the switch 12 (e.g., PFD 24, MFD 26, MAU 28, and MRC 30) are configured to transmit synchronized messages in response to the synchronization signal based on ASCB. For example, in response to the synchronization signal, each of the PFD 24, MFD 26, MAU 28, and MRC 30 transmits a corresponding synchronous message to the switch 12 using a periodic device driver. In another exemplary embodiment, one or more of the LRUs coupled to the switch 12 are configured to transmit synchronized messages based on predetermined time slots, and the CPU 18 retrieves messages via the communication interface 16 from these LRUs at the corresponding predetermined time slot. This adaptation to LRUs that transmit/receive communication based on ASCB or other synchronized communication formats as well as to LRUs that transmit/receive communication without regard to synchronization simplifies implementation of the present invention with conventional avionic system devices. For example, the switch 12 operates to transmit/receive messages of a variety of data formats (e.g., synchronous and asynchronous messages) and, thus, legacy LRUs may be coupled to the switch 12 and transmit/receive communication without additional modification to such LRUs.

In one exemplary embodiment, the CPU 18 follows a predetermined schedule, based on the corresponding predetermined time slots for the LRUs transmitting periodic communications, to receive the synchronous messages. For example, once a synchronous message is received, the CPU 18 forwards or re-transmits the synchronous message to the corresponding predetermined time slot then determines whether additional messages (e.g., synchronous or asynchronous) have been received at the Ethernet interface 16. In another exemplary embodiment, after receiving the synchronous messages from the LRUs known by the CPU 18 to transmit synchronous messages, the CPU 18 may forward each of the synchronous messages to time slots within the frame based on any number of factors. In this exemplary embodiment, the CPU 18 may require a faster processing rate and the memory 20 may have a greater capacity. Factors that may be considered when allocating a particular time slot may include, but are not necessarily limited to, historical system performance, LRU type, and/or any number of other factors that may affect the latency of communication in the avionic network. The CPU 18 may also forward the synchronous messages to the predetermined time slots, within the frame, on a first available basis as the synchronous messages are received from the LRUs.

One or more of the predetermined time slots has a portion of time that is unoccupied by the synchronous message, and typically all of the predetermined time slots for a particular frame have an unoccupied portion. LRUs transmitting ASCB data operate with a maximum message length that is based on a predetermined data transfer rate. By allocating the time slots for synchronous messages in a fashion that leaves unoccupied time slots in the corresponding frame, capacity is available for asynchronous messages.

When an asynchronous message, or a message other than ASCB data, is received by the switch 12, such as from the audio device 32, ARINC 664 device, or LAN device 36, the switch 12 allocates the asynchronous message to the unoccupied portion of one of the predetermined time slots in the frame. The CPU 18 may determine the length of the asynchronous message and allocate the asynchronous message to an unoccupied portion that is sufficiently long to accommodate the length of the asynchronous message. When receiving multiple asynchronous messages, regardless of the source device, the CPU 18 may allocate one or more asynchronous messages to one or more predetermined time slots based on any number and variety of factors (e.g., first received-first allocated). For example, the CPU 18 may assign priorities to the asynchronous messages based on the data type of the asynchronous messages and allocate the asynchronous messages in an order based on the priority of the asynchronous messages. Audio data may have a high priority (e.g., a high priority following the synchronous message), ARINC 664 data may have a medium priority, and LAN data may have a low priority. In this example when the audio device 32, ARINC 664 device, and LAN device 36 transmit asynchronous messages, the CPU 18 allocates the message from the audio device 32, allocates the message from the ARINC 664 device, and then allocates the message from the LAN device 36. Using a priority configuration prevents lower priority sources from affecting deterministic system data while attempting to minimize transport delay for event-driven data.

The synchronous messages and asynchronous messages are routed by the switch 12. In one exemplary embodiment, the synchronous messages are broadcasted to the LRUs that operate on a synchronous basis, and the asynchronous messages are routed to a designated destination. In some instances, the messages may be transmitted to other switches and/or LRUs coupled to such switches. Thus, both periodic (e.g., time-triggered) and aperiodic (e.g., event-triggered) data transfers are supported by the switch 12. The switch 12 accommodates diverse data while minimizing any burden to network interface devices (e.g., network interface cards (NICs)), backplanes, and clients in the avionic system. The switch 12 delivers ASCB periodic data to all ASCB nodes and delivers validated ARINC 664 data to addressed destination nodes.

Figure 2:
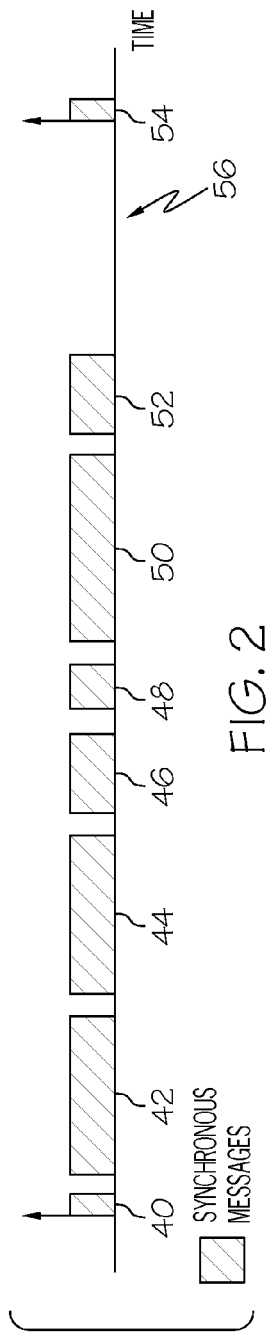
FIG. 2 is a timing diagram of synchronous messages on an exemplary embodiment of an Avionics Standard Communication Bus.

FIG. 2 is a timing diagram of synchronous messages on an exemplary embodiment of an ASCB. At the beginning of each frame, a synchronization signal 40, 54 is transmitted. Within the frame, the synchronous messages are allocated to corresponding predetermined time slots 42, 44, 46, 48, 50, and 52. Adjacent time slots are separated by gaps in the frame. In this exemplary embodiment, a first synchronous message is allocated to a first time slot 42, a second synchronous message is allocated to a second time slot 44, a third synchronous message is allocated to a third time slot 46, a fourth synchronous message is allocated to a fourth time slot 48, a fifth synchronous message is allocated to a fifth time slot 40, and a sixth synchronous message is allocated to a sixth time slot 52. An unoccupied portion 56 of the frame may be used to transmit other received messages (e.g., asynchronous messages).

Figure 3:
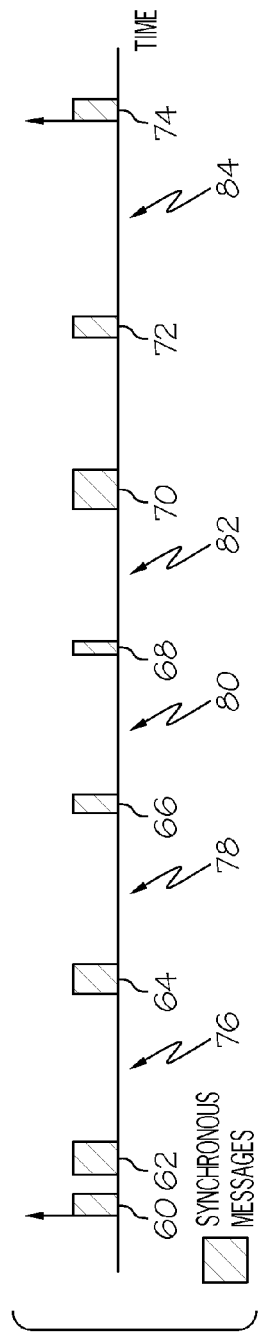
FIG. 3 is a timing diagram of synchronous messages on a communication bus in accordance with an exemplary embodiment of the present invention.

FIG. 3 is a timing diagram of synchronous messages on a communication bus in accordance with an exemplary embodiment of the present invention. At the beginning of each frame, a synchronization signal 60, 74 is transmitted by the switch 12. Within the frame, the synchronous messages (e.g., ASCB data) 62, 64, 66, 68, 70, 72 are allocated to corresponding predetermined time slots. Because the switch 12 and Ethernet interface 16 uses communication rates that are higher than ASCB, the same synchronous messages shown in FIG. 2 occupy a significantly shorter duration in the frame. As best shown in FIG. 3, these allocations 62, 64, 66, 68, 72 produce unoccupied portions 76, 78, 80, 82, 84 associated with each of the corresponding time slots, respectively. The predetermined time slots may be periodically spaced within the frame.

Figure 4:
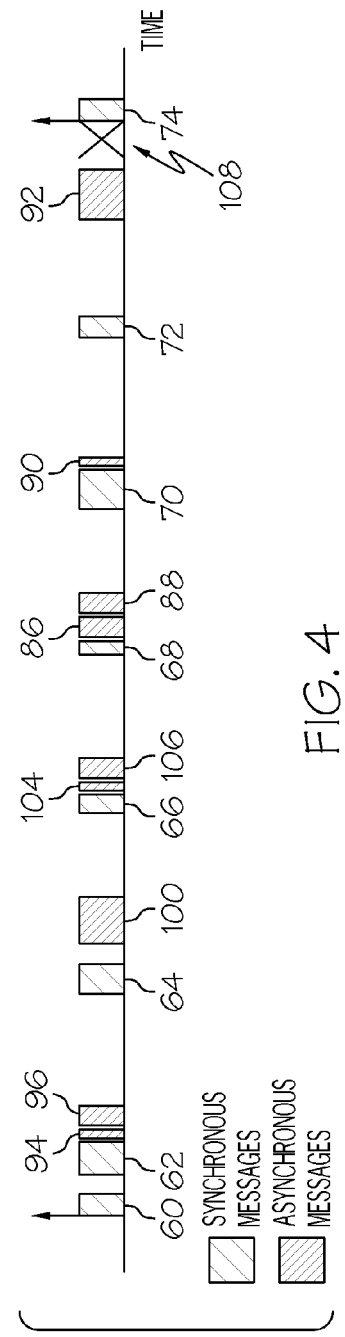
FIG. 4 is a timing diagram of synchronous and asynchronous messages on a communication bus in accordance with an exemplary embodiment of the present invention.

FIG. 4 is a timing diagram of synchronous and asynchronous communications on a communication bus in accordance with an exemplary embodiment of the present invention. Asynchronous communications are allocated in unoccupied portions for each of the predetermined time slots shown in FIG. 3 while maintaining separation of the messages between the predetermined time slots and between one frame and the next frame (e.g., a refusal window 108 separates messages in the first frame from the next frame). In this exemplary embodiment, the received communications are prioritized with ACSB data having a first priority, audio data having a second priority, ARINC 664 data having a third priority, and LAN data having a fourth priority. Following the first synchronous message 62 in the first time slot, a first audio message 94 is allocated and a first ARINC 664 message 96 is allocated subsequent to the first audio message 94. Following the second synchronous message 64 in the second time slot, a first LAN message 100 is allocated. Following the third synchronous message 66, a second audio message 104 is allocated and a second LAN message 106 is allocated subsequent to the second audio message 104. Following the fourth synchronous message 68, a second ARINC 664 message 86 is allocated and a third LAN message 88 is allocated subsequent to the second ARINC 664 message. Following the fifth synchronous message 70, a third audio message 90 is allocated. Following the sixth synchronous message 72, a fourth LAN message 92 is allocated prior to the refusal window 108.

Figure 5:
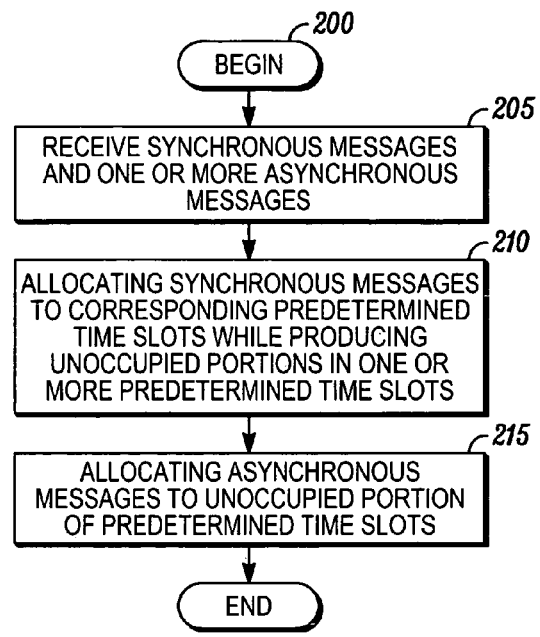
FIG. 5 is a flow diagram of a method for controlling synchronous and asynchronous communication in an avionic network in accordance with an exemplary embodiment of the present invention.

FIG. 5 is a flow diagram of a method 200 for controlling synchronous and asynchronous communication in an avionic network in accordance with an exemplary embodiment of the present invention. A synchronization signal may be transmitted to indicate the start of a frame. Synchronous messages and asynchronous messages are received at step 205. The synchronous messages may be based on ASCB data, and the asynchronous messages may be based on non-ASCB data such as audio data, ARINC 664 data, LAN data, and the like. The synchronous messages are allocated to corresponding predetermined time slots while unoccupied portions in one or more of the predetermined time slots are produced at step 210. The synchronous messages may be allocated to predetermined time slots in the frame based on historical system performance, message length, first received-first allocated, and other factors. In one exemplary embodiment, a synchronous message is received during a corresponding predetermined time slot and allocated to the corresponding predetermined time slot, and then a determination is made for received asynchronous messages. In another exemplary embodiment, synchronous messages are received for a corresponding frame and allocated to the corresponding predetermined time slots in the frame, and then a determination is made for received asynchronous messages. The asynchronous messages are allocated to the unoccupied portions of the predetermined time slots at step 215. The length (e.g., available time) for each of the unoccupied portions may be determined and compared with the length of a particular asynchronous message prior to allocating the asynchronous message. For example, the asynchronous message may be allocated to a particular unoccupied portion when the length of the asynchronous message is within the length of the unoccupied portion. While asynchronous messages may be allocated to the unoccupied portion of the last predetermined time slot in the frame, the asynchronous messages are preferably allocated to the unoccupied portions of predetermined time slots occurring prior to the last predetermined time slot in the frame (e.g., on a first available basis). A priority may be assigned to each of the asynchronous messages based on the particular data type of the asynchronous message. The asynchronous messages may then be allocated in an order based on the priority of the asynchronous messages. With multiple asynchronous messages, one or more asynchronous messages may be allocated to the unoccupied portion of a single predetermined time slot depending on the size of the asynchronous messages. As the asynchronous messages are allocated to the unoccupied portions of the predetermined time slots in the frame, a determination may be made of the current unoccupied portions of each of the predetermined time slots in the frame and tracked for future allocations in the frame.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for synchronizing communication in an avionics Ethernet network, the method comprising:
   receiving a first asynchronous message and one or more synchronous messages;
   allocating each of the one or more received synchronous messages to a corresponding one of one or more predetermined time slots in a fashion that causes an unoccupied portion in at least one of the one or more predetermined time slots to be produced; and
   allocating the received first asynchronous message to the unoccupied portion of one of the at least one of the one or more predetermined time slots;
   wherein receiving the one or more synchronous messages comprises receiving the one or more synchronous messages from a first communication bus operating at a first communication rate;
   wherein allocating each of the one or more received synchronous messages comprises allocating each of the one or more received synchronous messages to a corresponding one of one or more predetermined time slots of a frame operating at a second communication rate higher than the first communication rate to produce the unoccupied portion in at least one of the one or more predetermined time slots.

2. A method according to claim 1, wherein the first asynchronous message is selected from an ARINC 664 data communication, an audio data communication, and a local area network (LAN) data communication.

3. A method according to claim 1, wherein said step of allocating each of the one or more synchronous messages comprises producing the unoccupied portion in a first predetermined time slot of the at least one of the one or more predetermined time slots; and
   wherein said step of allocating the first asynchronous message comprises allocating the first asynchronous message to the unoccupied portion of the first predetermined time slot when a message length of the first asynchronous message is less than the unoccupied portion of the first predetermined time slot.

4. A method according to claim 1 further comprising determining a capacity of the unoccupied portion of the one of the at least one of the one or more predetermined time slots prior to said step of allocating the first asynchronous message.

5. A method according to claim 1 further comprising transmitting a signal indicating a synchronization for a frame, the one or more predetermined time slots occurring within the frame; and wherein said step of receiving comprises:
   receiving the one or more synchronous messages for the frame; and
   receiving the first asynchronous message during the frame.

6. A method according to claim 1, wherein said step of allocating the first asynchronous message comprises allocating the first asynchronous message to the unoccupied portion of a first predetermined time slot of the one or more predetermined time slots, the first predetermined time slot of the one or more predetermined time slots occurring before the last predetermined time slot of the one or more predetermined time slots.

7. A method according to claim 6 further comprising:
   receiving a second asynchronous message;
   allocating the second asynchronous message to the unoccupied portion of the first predetermined time slot of the one or more predetermined time slots, the first asynchronous message non-overlapping the second asynchronous message in the unoccupied portion of the first predetermined time slot.

8. A method according to claim 6 further comprising:
   receiving a second asynchronous message;
   allocating the second asynchronous message to the unoccupied portion of a second predetermined time slot of the one or more predetermined time slots, the second predetermined time slot subsequent to the first predetermined time slot.

9. A method according to claim 6 further comprising:
   receiving a second asynchronous message;
   assigning a priority to each of the first and second asynchronous messages based on a corresponding data type of the first and second asynchronous messages;
   allocating the second asynchronous message to the unoccupied portion of the first predetermined time slot of the one or more predetermined time slots prior to said step of allocating the first asynchronous message when the priority of the second asynchronous message is greater than the priority of the first asynchronous message; and
   allocating the second asynchronous message to the unoccupied portion of the first predetermined time slot of the one or more predetermined time slots subsequent to said step of allocating the first asynchronous message when the priority of the second asynchronous message is lesser than the priority of the first asynchronous message.

10. A method for synchronizing one or more periodic communications and one or more aperiodic communications in an Ethernet network, each of the one or more periodic communications received from a first communication bus operating at a first communication rate and allocated to a corresponding one of one or more predetermined time slots, the method comprising:
    determining a portion for each of the one or more predetermined time slots, the portion of each of the one or more predetermined time slots unoccupied by a corresponding one of the one or more periodic communications based on a manner in which the one or more periodic communications are allocated to the corresponding one or more predetermined time slots, wherein the one or more periodic communications are allocated to the corresponding one or more predetermined time slots of a frame operating at a second communication rate higher than the first communication rate to produce the unoccupied portion for each of the one or more predetermined time slots;
    receiving the one or more aperiodic communications; and
    allocating at least one of the one or more received aperiodic communications to the portion of at least one of the one or more predetermined time slots.

11. A method according to claim 10, wherein the portion of each of the one or more predetermined time slots is subsequent to a corresponding one of the one or more periodic communications.

12. A method according to claim 10, wherein the one or more aperiodic communications is selected from an ARINC 664 data communication, an audio data communication, and a local area network (LAN) data communication.

13. A method according to claim 10 further comprising assigning a priority to each of the one or more aperiodic communications, and wherein said step of allocating comprises allocating each of the one or more aperiodic communications to the portion of the at least one of the one or more predetermined time slots in an order based on the priority of each of the one or more aperiodic communications.

14. A method according to claim 10, wherein said allocating step comprises:

allocating a first aperiodic communication of the one or more aperiodic communications to the portion of a first predetermined time slot of the one or more predetermined time slots; and allocating a second aperiodic communication of the one or more aperiodic communications to the portion of the first predetermined time slot, the first aperiodic communication non-overlapping the second aperiodic communication in the first predetermined time slot.

15. A method according to claim 10, wherein said allocating step comprises allocating each of the one or more aperiodic communications to the portion of a different one of the one or more predetermined time slots.

16. A method according to claim 10, further comprising assigning a priority to each of the one or more aperiodic communications prior to said allocating step, the priority of each of the one or more aperiodic communications based on a data type of a corresponding one of the one or more aperiodic communications; wherein said allocating step comprises:

allocating a first aperiodic communication of the one or more aperiodic communications to the portion of a first predetermined time slot of the one or more predetermined time slots; and allocating a second aperiodic communication of the one or more aperiodic communications to the portion of the first predetermined time slot subsequent to the first aperiodic communication when the priority of the first aperiodic communication is greater than the priority of the second aperiodic communication.

17. A method according to claim 10, further comprising assigning a priority to each of the one or more aperiodic communications prior to said allocating step, the priority of each of the one or more aperiodic communications based on a data type of a corresponding one of the one or more aperiodic communications; wherein said allocating step comprises:

allocating a first aperiodic communication of the one or more aperiodic communications to the portion of a first predetermined time slot of the one or more predetermined time slots; and allocating a second aperiodic communication of the one or more aperiodic communications to the portion of a second predetermined time slot of the one or more predetermined time slots when the priority of the second aperiodic communication is lesser than the priority of the first aperiodic communication, the second predetermined time slot subsequent to the first predetermined time slot.

18. An apparatus for managing data communications in an Ethernet network, the apparatus comprising:

a processor having an input for receiving at least one periodic communication and at least one aperiodic communication, the at least one periodic communication received from a first communication bus operating at a first communication rate, said processor configured to:

schedule each of said at least one received periodic communication for transmission during a corresponding one of at least one predetermined time slot, wherein the processor causes an unoccupied portion in one or more of the at least one predetermined time slot to be produced by scheduling each of said at least one received periodic communications to the corresponding one of at least one predetermined time slot of a frame operating at a second communication rate higher than the first communication rate; and schedule each of said at least one received aperiodic communication for transmission during the unoccupied portion of one of said at least one predetermined time slot;

a memory coupled to said processor, said memory storing said at least one data communication; and a communication interface coupled to said processor, said communication interface for transmitting each of said at least one received periodic communication and each of said at least one received aperiodic communication in response to said processor.

19. An apparatus according to claim 18, wherein each of said at least one aperiodic communication has a priority; and wherein said processor is further configured to schedule each of said at least one aperiodic communication for transmission based on said priority of each of said at least one aperiodic communication.

* * * * *